United States Patent
Dharmshaktu et al.

(10) Patent No.: US 12,556,478 B2
(45) Date of Patent: Feb. 17, 2026

(54) BGP SEGMENT ROUTING OPTIMIZATION BY PACKING MULTIPLE PREFIXES IN AN UPDATE

(71) Applicant: Ciena Corporation, Hanover, MD (US)

(72) Inventors: Anil Dharmshaktu, Gurgaon (IN); Varun Munjal, Gurgaon (IN); Param Preet Dhillon, Gurgaon (IN); Piyush Sharma, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/962,618

(22) Filed: Oct. 10, 2022

(65) Prior Publication Data
US 2024/0073135 A1    Feb. 29, 2024

(51) Int. Cl.
| | |
|---|---|
| H04L 12/723 | (2013.01) |
| G06F 15/173 | (2006.01) |
| H04L 12/26 | (2006.01) |
| H04L 12/28 | (2006.01) |
| H04L 12/715 | (2013.01) |
| H04L 29/08 | (2006.01) |
| H04L 45/02 | (2022.01) |
| H04L 45/741 | (2022.01) |
| H04L 45/748 | (2022.01) |

(52) U.S. Cl.
CPC ............ *H04L 45/741* (2013.01); *H04L 45/02* (2013.01); *H04L 45/748* (2013.01)

(58) Field of Classification Search
CPC ...... H04L 45/741; H04L 45/02; H04L 45/748
See application file for complete search history.

(56) References Cited

U.S. PATENT DOCUMENTS

| | | | |
|---|---|---|---|
| 9,237,090 B2 | 1/2016 | Tripathi et al. | |
| 9,509,593 B2 | 11/2016 | Sharma et al. | |
| 9,516,118 B2 * | 12/2016 | Kini | H04L 43/10 |
| 9,538,573 B2 | 1/2017 | Khan et al. | |
| 10,158,448 B2 | 12/2018 | Prakash et al. | |
| 10,158,500 B2 | 12/2018 | Chhabra et al. | |
| 10,862,797 B2 | 12/2020 | Gautam et al. | |
| 10,887,225 B1 * | 1/2021 | Chan | H04L 45/34 |
| 10,917,330 B1 * | 2/2021 | Szarecki | H04L 45/507 |
| 11,438,259 B2 * | 9/2022 | Torvi | H04L 45/04 |
| 11,722,401 B2 * | 8/2023 | Hu | H04L 45/50  370/218 |
| 2004/0090913 A1 * | 5/2004 | Scudder | H04L 45/02  370/219 |

(Continued)

OTHER PUBLICATIONS

S. Previdi et al., "Segment Routing Prefix SID extensions for BGP," Internet-Draft, Standards Track, Jun. 26, 2018, pp. 1-20.

*Primary Examiner* — Umar Cheema
*Assistant Examiner* — Golam Mahmud
(74) *Attorney, Agent, or Firm* — Baratta Law PLLC; Lawrence A. Baratta, Jr.

(57) ABSTRACT

Systems and methods for border gateway protocol (BGP) Segment Routing (SR) (BGP-SR) update packing include negotiating with border gateway protocol (BGP) peers for packing BGP-Segment Routing (BGP-SR) updates, receiving a plurality of prefixes for a BGP-SR update message, encoding the plurality of prefixes with associated label information in network layer reachability information (NLRI) of the BGP-SR update message, and transmitting the BGP-SR update message to any of the BGP peers.

20 Claims, 5 Drawing Sheets

(56) References Cited

U.S. PATENT DOCUMENTS

| | | | |
|---|---|---|---|
| 2006/0233181 A1* | 10/2006 | Raszuk | H04L 45/54 |
| | | | 370/401 |
| 2014/0226531 A1* | 8/2014 | Farkas | H04L 12/4641 |
| | | | 370/256 |
| 2015/0326675 A1* | 11/2015 | Kini | H04L 43/10 |
| | | | 709/224 |
| 2017/0026288 A1* | 1/2017 | Yang | H04L 45/033 |
| 2018/0337852 A1* | 11/2018 | Gunalan | H04L 45/54 |
| 2019/0305988 A1* | 10/2019 | Bickhart | H04L 45/025 |
| 2019/0379596 A1 | 12/2019 | Sharma et al. | |
| 2021/0029026 A1* | 1/2021 | Deshmukh | H04L 45/34 |
| 2021/0266272 A1* | 8/2021 | Dutta | H04L 45/50 |
| 2021/0273827 A1* | 9/2021 | Vairavakkalai | H04L 12/4633 |
| 2022/0094601 A1* | 3/2022 | Dutta | H04L 45/04 |
| 2022/0124186 A1* | 4/2022 | Dutta | H04L 69/40 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |            Length             |   RESERVED    |
+-+-+-+-+-+-+-+-+-+-+-+-+-+-+-+-+-+-+-+-+-+-+-+-+-+-+-+-+-+-+-+-+
|           Flags               |          Label Index          |
+-+-+-+-+-+-+-+-+-+-+-+-+-+-+-+-+-+-+-+-+-+-+-+-+-+-+-+-+-+-+-+-+
|          Label Index          |
+-+-+-+-+-+-+-+-+-+-+-+-+-+-+-+-+
```

*FIG. 1*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |            Length             |     Flags     |
+-+-+-+-+-+-+-+-+-+-+-+-+-+-+-+-+-+-+-+-+-+-+-+-+-+-+-+-+-+-+-+-+
|     Flags     |
+-+-+-+-+-+-+-+-+

+-+-+-+-+-+-+-+-+-+-+-+-+-+-+-+-+-+-+-+-+-+-+-+-+-+-+-+-+-+-+-+-+
|             SRGB 1 (6 octets)                                 |
|                               +-+-+-+-+-+-+-+-+-+-+-+-+-+-+-+-+
|                               |
+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|             SRGB n (6 octets)                                 |
|                               +-+-+-+-+-+-+-+-+-+-+-+-+-+-+-+-+
|                               |
+-+-+-+-+-+-+-+-+-+-+-+-+-+-+-+-+
```

BGP SEGMENT ROUTING OPTIMIZATION BY PACKING MULTIPLE PREFIXES IN AN UPDATE

FIELD OF THE DISCLOSURE

The present disclosure relates generally to networking and computing. More particularly, the present disclosure relates to systems and methods for border gateway protocol (BGP) Segment Routing optimization by packing multiple prefixes in an update.

BACKGROUND OF THE DISCLOSURE

RFC 8669, "Segment Routing Prefix Segment Identifier Extensions for BGP," December 2019, the contents of which are incorporated by reference in their entirety describes mechanisms for distributing BGP Segment Routing (BGP-SR) segment identifiers (SIDs) to BGP peers in BGP update messages. BGP-SR uses BGP Label-unicast network layer reachability information (NLRI) and adds new type-length-value (TLVs) in BGP update messages. As noted in RFC 8669, Segment Routing (SR) leverages the source-routing paradigm. A node steers a packet through an ordered list of instructions called "segments." A segment can represent any instruction, topological or service based. The ingress node prepends an SR header to a packet containing a set of segment identifiers (SIDs). Each SID represents a topological or service-based instruction. Per-flow state is maintained only on the ingress node of the SR domain. An "SR domain" is defined as a single administrative domain for global SID assignment. RFC 8669 defines an optional, transitive BGP attribute for announcing information about BGP Prefix Segment Identifiers (BGP Prefix-SIDs) and the specification for SR-MPLS SIDs.

One disadvantage of the approach described in RFC 8669 is a label index (Li) is associated with each BGP prefix. With a unique label index per NLRI in the attributes, there has to be a BGP update for each prefix. Use of RFC 8669 thus prevents the ability to pack multiple BGP-NLRIs in a single BGP update, referred to as BGP update packing for scale performance improvements.

BRIEF SUMMARY OF THE DISCLOSURE

The present disclosure relates to systems and methods for border gateway protocol (BGP) Segment Routing optimization by packing multiple prefixes in an update. The present disclosure includes a unique mechanism for packing BGP updates in a single update message for BGP-SR prefixes. This mechanism derives the BGP prefix SID from the NLRI label rather than the Label-Index TLV. Accordingly, Label-Index TLV in BGP prefix SID attribute, from RFC 8669, is not required allowing for packing BGP SR prefixes with different prefix SIDs in a single BGP update. This approach provides performance improvements on both the sender and receiver side resulting in better convergence time. Also, this approach is backward compatible and proposes a new BGP capability to enable this optimization.

In an embodiment, a router includes circuitry configured to negotiate with border gateway protocol (BGP) peers for packing BGP-Segment Routing (BGP-SR) updates, receive a plurality of prefixes for a BGP-SR update message, encode the plurality of prefixes with associated label information in network layer reachability information (NLRI) of the BGP-SR update message, and transmit the BGP-SR update message to any of the BGP peers. The plurality of prefixes all share same attributes. The BGP peers can all include a same segment routing global block (SRGB). Any of the BGP peers can include a different segment routing global block (SRGB), and wherein the circuitry is further configured to encode the SRGB of a node performing the transmitting in an attribute. The circuitry can be further configured to, responsive to any BGP peers failing to support the packing BGP-SR updates, encode each prefix in a separate BGP-SR update message. The circuitry can be further configured to receive a second BGP-SR update message from any of the BGP peers and determine an incoming label mapping (ILM) table based thereon. The associated label information can include the label for a corresponding prefix. The associated label information can include a label index for a corresponding prefix such that a label for the corresponding prefix is determined based on the label and a segment routing global block (SRGB). The plurality of prefixes can be any of Internet Protocol version 4 (IPv4) and IP version 6 (IPv6) addresses.

In another embodiment, a method includes negotiating with border gateway protocol (BGP) peers for packing BGP-Segment Routing (BGP-SR) updates; receiving a plurality of prefixes for a BGP-SR update message; encoding the plurality of prefixes with associated label information in network layer reachability information (NLRI) of the BGP-SR update message; and transmitting the BGP-SR update message to any of the BGP peers. The plurality of prefixes all share same attributes. The BGP peers can all include a same segment routing global block (SRGB). Any of the BGP peers include a different segment routing global block (SRGB), and wherein the steps can include encoding the SRGB of a node performing the transmitting in an attribute. The steps can include, responsive to any BGP peers failing to support the packing BGP-SR updates, encoding each prefix in a separate BGP-SR update message. The steps can include receiving a second BGP-SR update message from any of the BGP peers and determining an incoming label mapping (ILM) table based thereon. The associated label information can include the label for a corresponding prefix. The associated label information can include a label index for a corresponding prefix such that a label for the corresponding prefix is determined based on the label and a segment routing global block (SRGB). The plurality of prefixes can be any of Internet Protocol version 4 (IPv4) and IP version 6 (IPv6) addresses.

In a further embodiment, a non-transitory computer-readable medium includes instructions that, when executed, cause a network element to perform steps of negotiating with border gateway protocol (BGP) peers for packing BGP-Segment Routing (BGP-SR) updates; receiving a plurality of prefixes for a BGP-SR update message; encoding the plurality of prefixes with associated label information in network layer reachability information (NLRI) of the BGP-SR update message; and transmitting the BGP-SR update message to any of the BGP peers. The plurality of prefixes all share same attributes.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a diagram of a Label-Index TLV from RFC 8669.

FIG. 2 is a diagram of an Originator SRGB TLV from RFC 8669.

DETAILED DESCRIPTION OF THE DISCLOSURE

Again, the present disclosure relates to systems and methods for border gateway protocol (BGP) Segment Routing optimization by packing multiple prefixes in an update. The present disclosure includes a unique mechanism for packing BGP updates in a single update message for BGP-SR prefixes. This mechanism derives the BGP prefix SID from the NLRI label rather than the Label-Index TLV. Accordingly, Label-Index TLV in BGP prefix SID attribute, from RFC 8669, is not required allowing for packing BGP SR prefixes with different prefix SIDs in a single BGP update. This approach provides performance improvements on both the sender and receiver side resulting in better convergence time. Also, this approach is backward compatible and proposes a new BGP capability to enable this optimization.

1.0 RFC 8669

The Segment Routing (SR) architecture leverages the source-routing paradigm. A segment represents either a topological instruction, such as "go to prefix P following shortest path", or a service instruction. Other types of segments may be defined in the future. A segment is identified through a Segment Identifier (SID). An "SR domain" is defined as a single administrative domain for global SID assignment. It may include a single Autonomous System (AS) or multiple ASes under consolidated global SID administration. Typically, the ingress node of the SR domain prepends an SR header containing SIDs to an incoming packet.

As described in RFC 8402, "Segment Routing Architecture," July 2018, the contents of which are incorporated by reference in their entirety, when SR is applied to the MPLS data plane (see RFC 8660, "Segment Routing with the MPLS Data Plane," December 2019, the contents of which are incorporated by reference in their entirety), the SID includes a label.

A BGP Prefix Segment is a BGP prefix with a Prefix-SID attached. A BGP Prefix-SID is always a global SID (RFC 8402) within the SR domain and identifies an instruction to forward the packet over the Equal-Cost Multipath (ECMP) best path computed by BGP to the related prefix. The BGP Prefix-SID is the identifier of the BGP Prefix Segment. As described herein, we always refer to the BGP Prefix Segment by the BGP Prefix-SID.

RFC 8669 describes the BGP extensions to signal the BGP Prefix-SID. Specifically, RFC 8669 defines a BGP attribute known as the "BGP Prefix-SID attribute" and specifies the rules to originate, receive, and handle error conditions for the attribute.

The BGP Prefix-SID attribute defined in RFC 8669 can be attached to prefixes from Multiprotocol BGP IPv4/IPv6 Labeled Unicast (see RFC 4760, "Multiprotocol Extensions for BGP-4," January 2007, and RFC 8277, "Using BGP to Bind MPLS Labels to Address Prefixes," October 2017, the contents of each are incorporated by reference in their entirety). RFC 8670, "BGP Prefix Segment in Large-Scale Data Centers," December 2019, the contents of which are incorporated by reference in their entirety, describes example use cases where the BGP Prefix-SID is used for the above AFI/SAFI combinations.

It should be noted that:

1) A BGP Prefix-SID will be global across ASes when the interconnected ASes are part of the same SR domain. Alternatively, when interconnecting ASes, the Autonomous system border routers (ASBRs) of each domain will have to handle the advertisement of unique SIDs.
2) A BGP Prefix-SID may be attached to a BGP prefix. This implies that each prefix is advertised individually, reducing the ability to pack BGP advertisements (when sharing common attributes). Again, the present disclosure addresses this deficiency.

§ 1.1 MPLS BGP Prefix-SID

The BGP Prefix-SID is realized on the MPLS data plane in the following way:

1) The operator assigns a globally unique label index, L_I, to a locally originated prefix of a BGP speaker N, which is advertised to all other BGP speakers in the SR domain.
2) According to RFC 8402, each BGP speaker is configured with a label block called the segment routing global block (SRGB). While RFC 8402 recommends using the same SRGB across all the nodes within the SR domain, the SRGB of a node is a local property and could be different on different speakers.
3) If traffic engineering within the SR domain is required, each node may also be required to advertise topological information and Peer SIDs for each of its links and peers. This information is required to perform the explicit path computation and to express an explicit path as a list of SIDs. The advertisement of topological information and peer segments (Peer SIDs) is done through.
4) If a prefix segment is to be included in an MPLS label stack, e.g., for traffic-engineering purposes, knowledge of the prefix originator's SRGB is required in order to compute the local label used by the originator.
5) RFC 8669 assumes that Border Gateway Protocol-Link State (BGP-LS) is the preferred method for a collecting both peer segments (Peer SIDs) and SRGB information through RFC 7752, "North-Bound Distribution of Link-State and Traffic Engineering (TE) Information Using BGP," March 2016, the contents of which are incorporated by reference in their entirety. However, as an optional alternative for the advertisement of the local SRGB without the topology or the peer SIDs and, therefore, without applicability for TE, the Originator SRGB TLV of the BGP Prefix-SID attribute is specified in Sec. 3.2 of RFC 8669.
6) A BGP speaker will derive its local MPLS label L from the label index L_I and its local SRGB as described in RFC 8660. The BGP speaker then programs the MPLS label L in its MPLS data plane as its incoming/local label for the prefix.
7) The outgoing label for the prefix is found in the Network Layer Reachability Information (NLRI) of the Multiprotocol BGP IPv4/IPv6 Labeled Unicast prefix advertisement as defined in RFC 8277. The label index L_I is only used as a hint to derive the local/incoming label.

8) Sec. 3.1 of RFC 8669 specifies the Label-Index TLV of the BGP Prefix-SID attribute; this TLV can be used to advertise the label index for a given prefix.

§ 1.2 BGP Prefix-SID Attribute

The BGP Prefix-SID attribute is an optional, transitive BGP path attribute. The attribute type code 40 has been assigned by IANA.

The BGP Prefix-SID attribute is defined in RFC 8669 to be a set of elements encoded as "Type/Length/Value" tuples (i.e., a set of TLVs). All BGP Prefix-SID attribute TLVs will start with a 1-octet type and a 2-octet length. The following TLVs are defined in RFC 8669: Label-Index TLV (FIG. 1) and Originator SRGB TLV (FIG. 2). The Label-Index and Originator SRGB TLVs are used only when SR is applied to the MPLS data plane.

The Label-Index TLV is present in the BGP Prefix-SID attribute attached to IPv4/IPv6 Labeled Unicast prefixes. The Label-Index TLV includes a Type: 1, Length: 7, the total length in octets of the value portion of the TLV, RESERVED: 8-bit field, Flags: 16 bits of flags, and Label Index: 32-bit value representing the index value in the SRGB space.

The Originator SRGB TLV is an optional TLV and includes Type: 3, Length: The total length in octets of the value portion of the TLV: 2+(non-zero multiple of 6), Flags: 16 bits of flags, and SRGB: 3 octets specifying the first label in the range followed by 3 octets specifying the number of labels in the range. Note that the SRGB field may appear multiple times. If the SRGB field appears multiple times, the SRGB consists of multiple ranges that are concatenated.

The Originator SRGB TLV contains the SRGB of the node originating the prefix to which the BGP Prefix-SID is attached.

§ 1.3 Problem Description

When BGP-SR is enabled—

1) A segment identifier Label Index (Li) is manually associated with each BGP prefix.
2) Li+SRGB start-label→BGP SR label for prefix carried in NLRI
3) Label-Index Li is carried as attribute in MP-BGP packet in BGP update message In BGP, update messaging is optimized by packing multiple prefixes that share BGP attributes (AS-path, multiple exit discriminator (MED), etc.) in single update message. This helps in multifold performance improvement at both sender and receiver as otherwise sender need to create/encode/send N updates and receiver need to individually decode/process individual updates.

In BGP-SR, with the Label-index being part of attributes in BGP update message and Label-Index being unique for each prefix, BGP cannot pack updates multiple BGP-SR NLRIs that have same other attributes into single update message. This results in single BGP-SR update message per prefix. In a scaled network, it will be individual update message per prefix and hence not optimized from performance perspective.

Packing allows all NLRIs to be sent in single update message resulting in single update TX (faster Transmission of updates) and lesser update processing on receiving side.

This is important scale optimization in BGP that give multifold scale performance improvements. With unique label-index per NLRI in attribute, BGP-SR results in NO packing of BGP-SR NLRIs, and this has scale impact.

2.0 NETWORK

Figure 3:
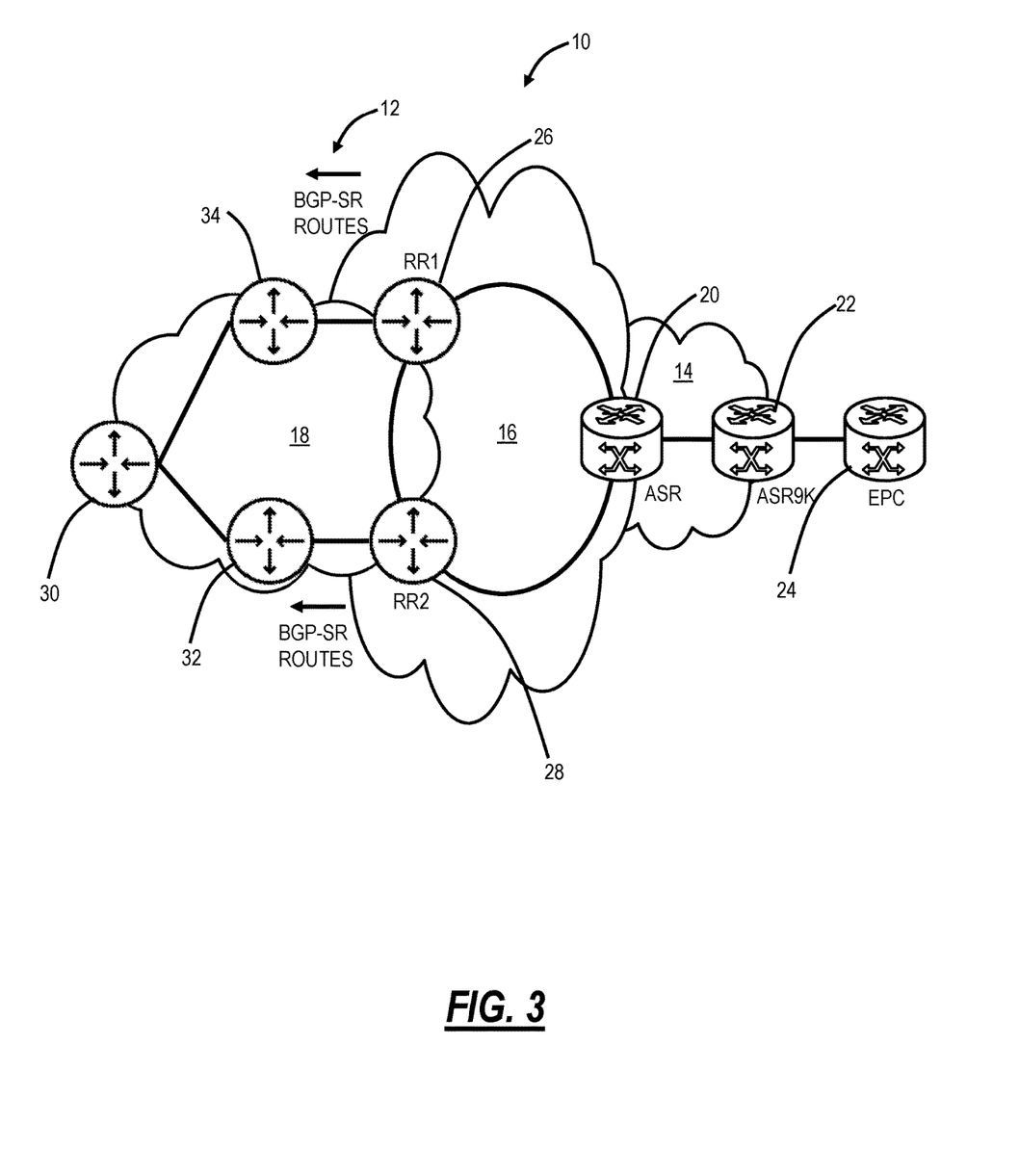
FIG. 3 is a network diagram of an example network for illustrating BGP-SR updates and the packing solution described herein.

FIG. 3 is a network diagram of an example network 10 for illustrating BGP-SR updates 12 and the packing solution described herein. The network 10 includes three SR domains 14, 16, 18. The domain 14 includes an ASR 20 and an ASR9k 22 connected to an evolved packet core (EPC) 24. The domain 16 includes the ASR 20 connected to two route reflectors (RR1, RR2) 26, 28. The domain 18 includes the RR1, RR2 26, 28 and routers 30, 32, 34. The RR1, RR2 26, 28 are configured to provide the BGP-SR updates 12 from the domains 14, 16. Those skilled in the art will recognize the example network 10 is presented for illustration purposes and other embodiments are contemplated. The present disclosure relates to the BGP-SR updates 12 and a packing solution that overcomes the limitations in RFC 8669. As such, the BGP-SR updates 12 can be performed by any of the ASR 20, ASR9k 22, EPC 24, RR1, RR2 26, 28, and the routers 30, 32, 34.

3.0 BGP SEGMENT ROUTING OPTIMIZATION BY PACKING UPDATES

In various embodiments, a BGP prefix SID based Label is carried in the NLRI and BGP prefix SID label Index can be derived from Label in NLRI, instead of adding label Index TLV in BGP update message. This provides a single BGP-SR update message for BGP Prefixes with the same attributes. This mechanism derives the BGP prefix SID from the label Index TLV in BGP prefix SID. Hence, Label Index TLV is not required in BGP prefix SID TLV that results in packing. Hence, BGP prefix SID TLV is not required that results in packing BGP SR prefixes with different prefix SIDs in single BGP update.

To enable this mode a new BGP capability is proposed referred to as BGP-SR update packing. For BGP peers, e.g., the RR1, RR2 26, 28, and the routers 30, 32, 34, where this new capability is negotiated, BGP sender (e.g., the RR1, RR2 26, 28) will encode BGP NLRI with actual Label (SRGB start+Li) and will not add BGP Label-Index TLV. This will assure that rest of attributes can be shared and so multiple NLRI's can be packed in single update message.

In addition, a new optional sub-TLV attribute in the BGP prefix SID can be referred to as a peer SRGB range sub-TLV. This will carry a BGP peers SRGB range. In most of SR deployments, the SRGB range is kept same throughout the SR domains 14, 16, 18. This is optional if the domains 14, 16, 18 have different SRGBs. In case this sub-TLV attribute is not present, a node will use its own SRGB range and calculate the label-index. The calculation can include:

Label Index=Label(fetched from NLRI)—Peer SRGB start Label(either from peer SRGB sub-TLV or local SRGB start Label).

Accordingly, the node will use the start label in the SRGB and the label index to create its own in-label for an incoming label mapping (ILM) table.

In a scenario where we have different SRGB range in the same SR domain, the new optional sub-TLV attribute can be added. All the prefixes that are coming from this node (with the network service header (NSH) will have same Peer SRGB range and can still be shared in single update message.

Also, this new BGP capability will ensure that we are backward compatible with RFC8669. In case the new BGP capability is not negotiated, a node will behave as per RFC 8669.

§ 3.1 BGP Segment Routing Optimization Example Case 1

Figure 4:
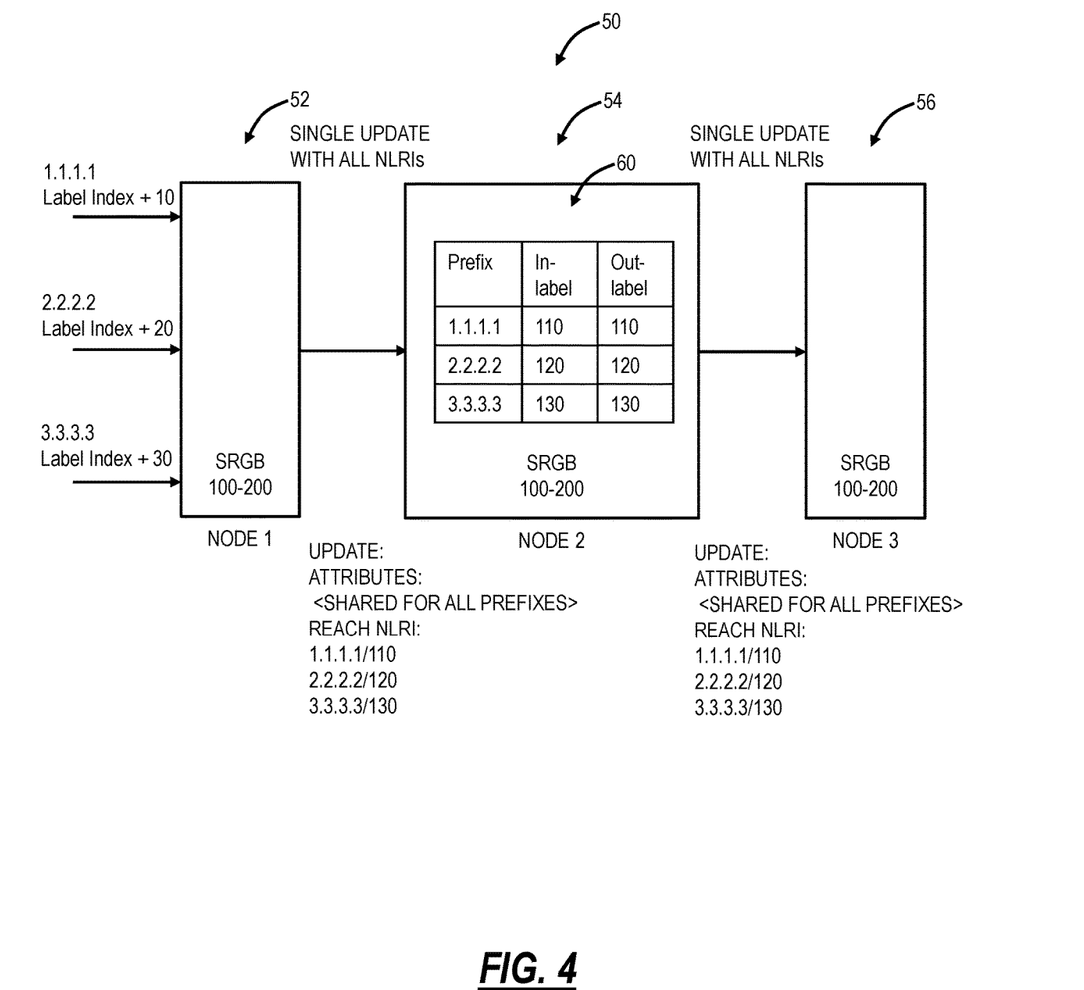
FIG. 4 is a network diagram of a network for illustrating a single update with the label index in the NLRI with all nodes having the same SRGB.

FIG. 4 is a network diagram of a network 50 for illustrating a single update with the label index in the NLRI with all nodes 52, 54, 56 having the same SRGB. For example, in this case, the SRGB is 100 to 200. In this example, node 1 52 is sending three prefixes (1.1.1.1, 2.2.2.2, 3.3.3.3) towards nodes 2 54 and each prefix has a unique label index (+10, +20, +30 for 1.1.1.1, 2.2.2.2, 3.3.3.3, respectively). All prefixes will be sent in a single update message having the following information:

| Attributes | Shared for all prefixes |
|---|---|
| Reach NLRI | 1.1.1.1/110 (label index = 10) |
| | 2.2.2.2/120 (label index = 20) |
| | 3.3.3.3/130 (label index = 30) |

The node 2 54 will calculate the out label=local SRGB start label+Label_index received in NLRI. For example, for prefix 1.1.1.1, out label=100+10=110. Accordingly, the node 2 54 can determine an ILM table 60 as

| Prefix | In-label | Out-label |
|---|---|---|
| 1.1.1.1 | 110 | 110 |
| 2.2.2.2 | 120 | 120 |
| 3.3.3.3 | 130 | 130 |

§ 3.2 BGP Segment Routing Optimization Example Case 2

Figure 5:
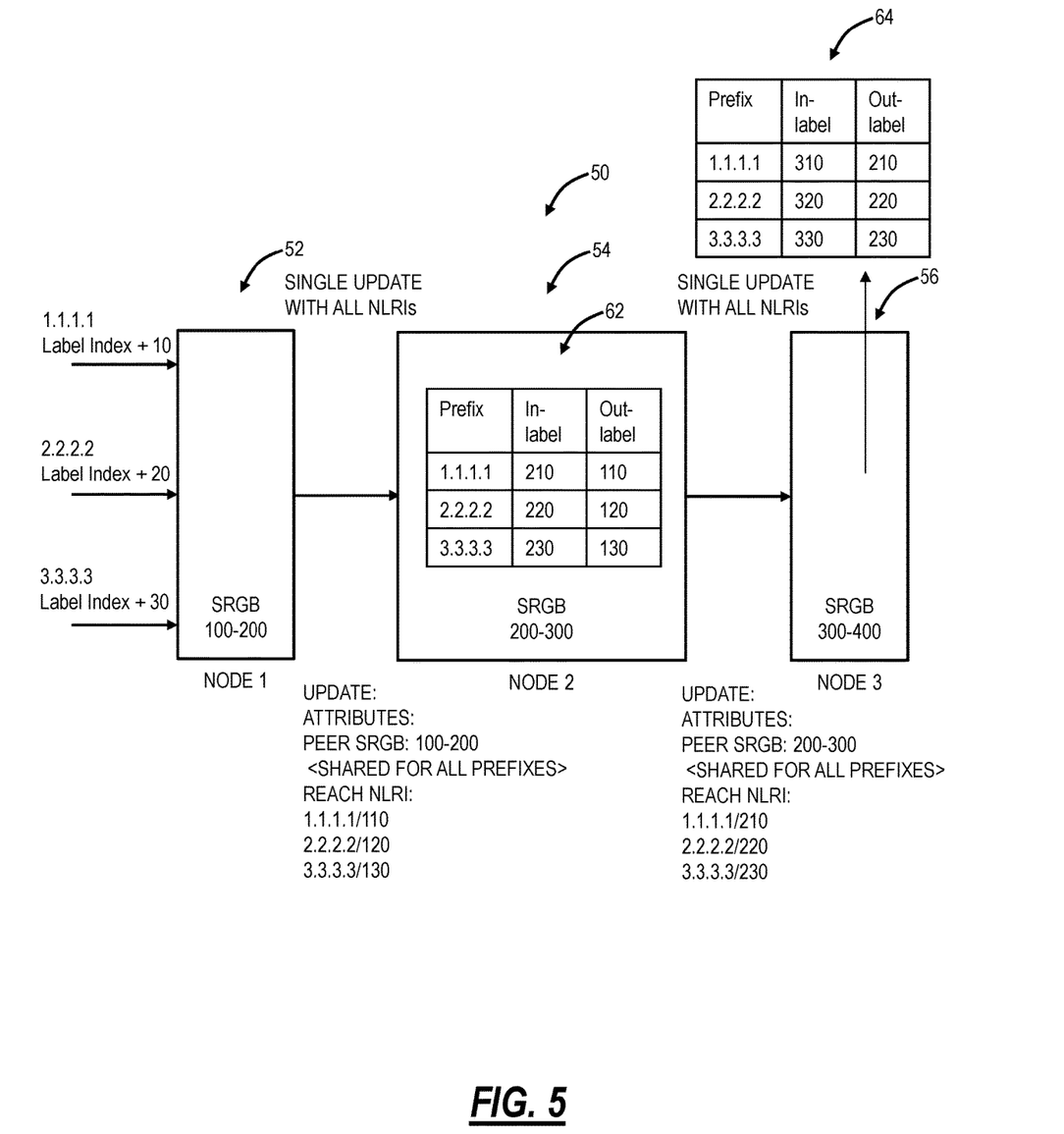
FIG. 5 is a network diagram of the network 50 for illustrating a single update with the label index in the NLRI with all nodes having a different SRGB.

FIG. 5 is a network diagram of the network 50 for illustrating a single update with the label index in the NLRI with all nodes 52, 54, 56 having a different SRGB. For example, in this case, the SRGB is 100 to 200 at the node 1 52, 200 to 300 at the node 2 54, and 300 to 400 at the node 3 56. Again, similar to FIG. 4, in this example node 1 52 is sending three prefixes (1.1.1.1, 2.2.2.2, 3.3.3.3) towards nodes 2 54 and each prefix has a unique label index (+10, +20, +30 for 1.1.1.1, 2.2.2.2, 3.3.3.3, respectively). All prefixes will be sent in a single update message having the following information:

| Attributes | Shared for all prefixes |
|---|---|
| optional peer SRGB sub-TLV attribute | Peer SRGB 100-200 |
| Reach NLRI | 1.1.1.1/110 (label index = 10) |
| | 2.2.2.2/120 (label index = 20) |
| | 3.3.3.3/130 (label index = 30) |

The node 2 54 will calculate the out label=local SRGB start label+Label_index received in NLRI. For example, for prefix 1.1.1.1, out label=100+10=110. The Label Index=Actual label received in NLRI−Peer SRGB start label. For prefix 1.1.1.1 on the node 2 54, Label Index=110−100 (SRGB of the node 1 52)=10. The In-label for 1.1.1.1 on the node 2 54, in-label=200 (Local SRGB start Label)+10 (label Index calculated above)=210. Accordingly, the node 2 54 can determine an ILM table 62 as

| Prefix | In-label | Out-label |
|---|---|---|
| 1.1.1.1 | 210 | 110 |
| 2.2.2.2 | 220 | 120 |
| 3.3.3.3 | 230 | 130 |

Similarly, for prefix 1.1.1.1 on the node 3 56, Label Index=210-200 (Peer SRGB for Node 2)=10. Accordingly, the node 2 56 can determine an ILM table 64 as

| Prefix | In-label | Out-label |
|---|---|---|
| 1.1.1.1 | 310 | 210 |
| 2.2.2.2 | 320 | 220 |
| 3.3.3.3 | 330 | 230 |

4.0 BGP SEGMENT ROUTING OPTIMIZATION PROCESS

Figure 6:
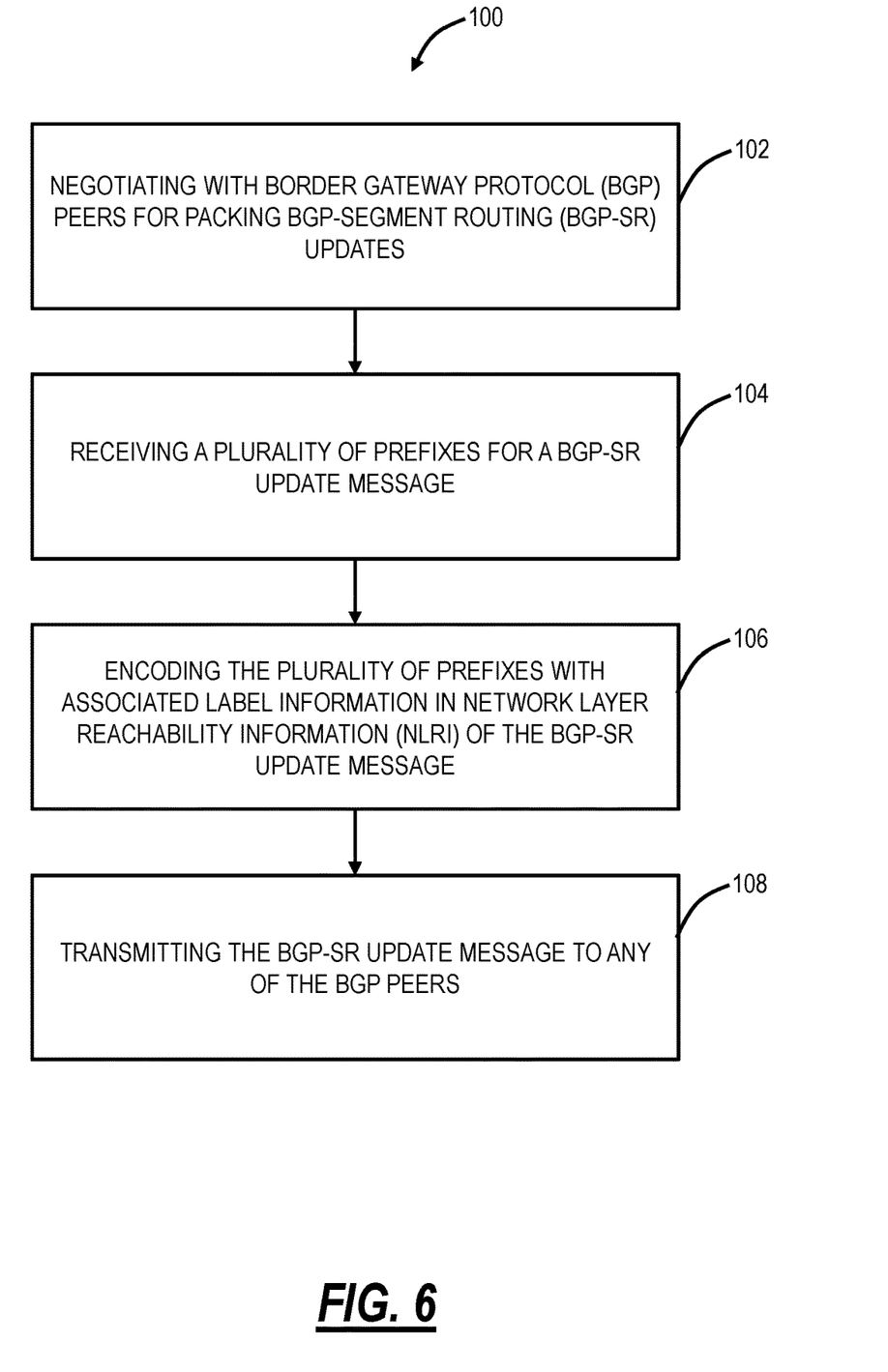
FIG. 6 is a flowchart of a process for border gateway protocol (BGP) Segment Routing optimization by packing updates.

FIG. 6 is a flowchart of a process 100 for border gateway protocol (BGP) Segment Routing optimization by packing updates. The process 100 contemplates implementation as a method having steps, via any network element in the network 10, including the routers 30, 32, 34, the route reflectors (RR1, RR2), and the like, as well as instructions stored in a non-transitory computer-readable medium that cause circuitry or the like to implement the steps.

The process 100 includes negotiating with border gateway protocol (BGP) peers for packing BGP-Segment Routing (BGP-SR) updates (step 102); receiving a plurality of prefixes for a BGP-SR update message (step 104); encoding the plurality of prefixes with associated label information in network layer reachability information (NLRI) of the BGP-SR update message (step 106); and transmitting the BGP-SR update message to any of the BGP peers (step 108). The plurality of prefixes all share same attributes, and the label is not encoded as an attribute as per RFC 8669.

The BGP peers all can include a same segment routing global block (SRGB). Also, ant of the BGP peers can include a different segment routing global block (SRGB), and wherein the process 100 includes encoding the SRGB of a node performing the transmitting in an attribute.

The process 100 can include, responsive to any BGP peers failing to support the packing BGP-SR updates, encoding each prefix in a separate BGP-SR update message as per RFC 8669. The process 100 can include receiving a second BGP-SR update message from any of the BGP peers and determining an incoming label mapping (ILM) table based thereon, such as described in FIGS. 4 and 5.

The associated label information can include the label for a corresponding prefix. The associated label information can include a label index for a corresponding prefix such that a label for the corresponding prefix is determined based on the label index and a segment routing global block (SRGB). The plurality of prefixes are any of Internet Protocol version 4 (IPv4) and IP version 6 (IPv6) addresses.

5.0 CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A router comprising circuitry configured to:
negotiate with border gateway protocol (BGP) peers for packing BGP-Segment Routing (BGP-SR) updates,
receive a plurality of prefixes for a BGP-SR update message,
encode the plurality of prefixes with associated label information in network layer reachability information (NLRI) of the BGP-SR update message, wherein the associated label information in the NLRI is utilized to derive a Segment Identifier (SID) for a corresponding prefix of the plurality of prefixes, wherein the BGP-SR update message is a single message for all of the plurality of prefixes each of which has a different SID which is derived from a calculation using the associated label information in the NLRI, and
transmit the BGP-SR update message to any of the BGP peers,
wherein the SID is derived for the corresponding prefix by determining a label index as a label from the associated label information for the corresponding prefix subtracted by a local or peer segment routing global block (SRGB) start, and
determining the SID as the local SRGB start plus the label index,
wherein the circuitry is further configured to encode in a peer SRGB range sub-TLV attribute of a BGP Prefix-SID TLV of the BGP-SR update message, a peer SRGB start label explicitly identifying a peer SRGB range shared uniformly across multiple BGP peers, wherein the peer SRGB start label is distinct from any locally allocated SRGB start labels or ranges and from any flexible algorithm definitions or identifiers and is explicitly used by receiving BGP peers to derive label indexes for Segment Identifiers.

2. The router of claim 1, wherein the plurality of prefixes all share same attributes.

3. The router of claim 1, wherein the BGP peers all include a same segment routing global block (SRGB).

4. The router of claim 1, wherein any of the BGP peers include a different segment routing global block (SRGB), and wherein the circuitry is further configured to
encode the SRGB of a node performing the transmitting in an attribute.

5. The router of claim 1, wherein the circuitry is further configured to
responsive to any BGP peers failing to support the packing BGP-SR updates, encode each prefix in a separate BGP-SR update message.

6. The router of claim 1, wherein the circuitry is further configured to
receive a second BGP-SR update message from any of the BGP peers and determine an incoming label mapping (ILM) table based thereon.

7. The router of claim 1, wherein the associated label information includes the label for a corresponding prefix.

8. The router of claim 1, wherein the BGP-SR update message excludes a Label Index type-length-value (TLV).

9. The router of claim 1, wherein the plurality of prefixes are any of Internet Protocol version 4 (IPv4) and IP version 6 (IPv6) addresses.

10. A method comprising steps of:
negotiating with border gateway protocol (BGP) peers for packing BGP-Segment Routing (BGP-SR) updates;
receiving a plurality of prefixes for a BGP-SR update message;
encode the plurality of prefixes with associated label information in network layer reachability information (NLRI) of the BGP-SR update message, wherein the associated label information in the NLRI is utilized to derive a Segment Identifier (SID) for a corresponding prefix of the plurality of prefixes, wherein the BGP-SR update message is a single message for all of the plurality of prefixes each of which has a different SID which is derived from a calculation using the associated label information in the NLRI, and
transmitting the BGP-SR update message to any of the BGP peers,
wherein the SID is derived for the corresponding prefix by determining a label index as a label from the associated label information for the corresponding prefix subtracted by a local or peer segment routing global block (SRGB) start, and determining the SID as the local SRGB start plus the label index, wherein the steps further include encoding, in a peer SRGB range sub-TLV attribute of a BGP Prefix-SID TLV of the BGP-SR update message, a peer SRGB start label explicitly identifying a peer SRGB range shared uniformly across multiple BGP peers wherein the peer SRGB start label is distinct from any locally allocated SRGB start labels or ranges and from any flexible algorithm definitions or identifiers, and is explicitly used by receiving BGP peers to derive label indexes for Segment Identifiers.

11. The method of claim 10, wherein the plurality of prefixes all share same attributes.

12. The method of claim 10, wherein the BGP peers all include a same segment routing global block (SRGB).

13. The method of claim 10, wherein any of the BGP peers include a different segment routing global block (SRGB), and wherein the steps include encoding the SRGB of a node performing the transmitting in an attribute.

14. The method of claim 10, wherein the steps include responsive to any BGP peers failing to support the packing BGP-SR updates, encoding each prefix in a separate BGP-SR update message.

15. The method of claim 10, wherein the steps include receiving a second BGP-SR update message from any of the BGP peers and determining an incoming label mapping (ILM) table based thereon.

16. The method of claim 10, wherein the associated label information includes the label for a corresponding prefix.

17. The method of claim 10, wherein the BGP-SR update message excludes a Label Index type-length-value (TLV).

18. The method of claim 10, wherein the plurality of prefixes are any of Internet Protocol version 4 (IPv4) and IP version 6 (IPv6) addresses.

19. A non-transitory computer-readable medium comprising instructions that, when executed, cause a network element to perform steps of:

negotiating with border gateway protocol (BGP) peers for packing BGP-Segment Routing (BGP-SR) updates;

receiving a plurality of prefixes for a BGP-SR update message;

encode the plurality of prefixes with associated label information in network layer reachability information (NLRI) of the BGP-SR update message, wherein the associated label information in the NLRI is utilized to derive a Segment Identifier (SID) for a corresponding prefix of the plurality of prefixes, wherein the BGP-SR update message is a single message for all of the plurality of prefixes each of which has a different SID which is derived from a calculation using the associated label information in the NLRI, and transmitting the BGP-SR update message to any of the BGP peers, wherein the SID is derived for the corresponding prefix by determining a label index as a label from the associated label information for the corresponding prefix subtracted by a local or peer segment routing global block (SRGB) start, and determining the SID as the local SRGB start plus the label index, wherein the steps further include encoding, in a peer SRGB range sub-TLV attribute of a BGP Prefix-SID TLV of the BGP-SR update message, a peer SRGB start label explicitly identifying a peer SRGB range shared uniformly across multiple BGP peers, wherein the peer SRGB start label is distinct from any locally allocated SRGB start labels or ranges and from any flexible algorithm definitions or identifiers, and is explicitly used by receiving BGP peers to derive label indexes for Segment Identifiers.

20. The non-transitory computer-readable medium of claim 19, wherein the plurality of prefixes all share same attributes.

* * * * *